Figure 1:
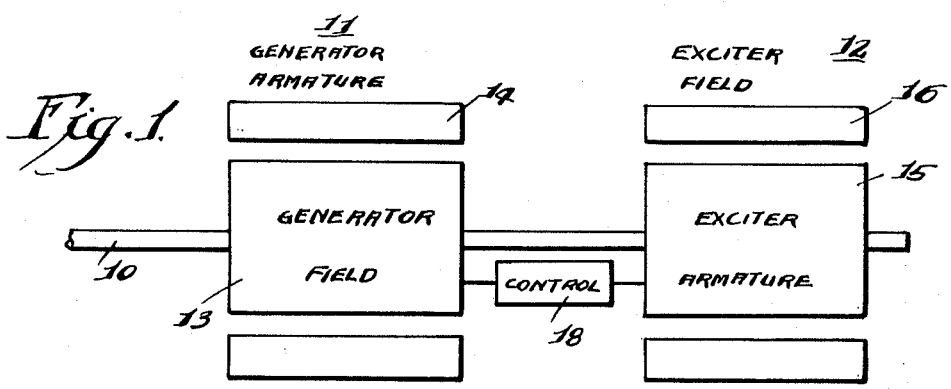

May 5, 1964 E. W. ERIKSON 3,132,297
FIELD CIRCUIT CONTROL
Filed Feb. 14, 1961

Inventor.
Evans W. Erikson.
Hofgren, Brady, Wegner,
Allen and Stellman
Attorneys.

United States Patent Office 3,132,297
Patented May 5, 1964

3,132,297
FIELD CIRCUIT CONTROL
Evans W. Erikson, Rockford, Ill., assignor to Sundstrand Corporation, a corporation of Illinois
Filed Feb. 14, 1961, Ser. No. 89,193
13 Claims. (Cl. 322—59)

This invention is concerned with a control for the field circuit of a generator and particularly a generator having a rotating field which is excited or energized from an exciter having a rotor mounted on the same shaft as the generator field and which generator may be used as an electric motor to start or aid in starting the prime mover which drives the generator and exciter.

The electrical system disclosed herein is particularly adapted for aircraft use and will be described generally in this environment, although it has other uses. In an aircraft, and particularly larger multi-engine aircraft, 400 cycle alternating current electrical systems are utilized with generators driven from each of the engines. As the engines may be operated at different speeds during different portions of its flight, it is necessary to provide a control over the generators to insure that they operate at a relatively constant speed so that the generator frequency is stable, and further to control the division of electrical load between the generators so that no one generator and engine supplies a disproportionate part of the electrical load. Various mechanisms and systems have been developed providing a variable mechanical connection or drive between the prime mover and the generator to afford the desired operating conditions. Reference may be had to Sadler et al. Patent 2,803,112 or Erikson Patent 2,900,527, for examples of such systems.

Further developments in this general field have led to the use of the generator in starting the prime mover. In such a starting arrangement, the generator is operated initially as an induction motor, bringing it up to synchronous speed, and then operated as synchronous motor, acting through the variable drive to accelerate the engine to starting speed. In a system where the generator is used as an engine starting motor it is necessary to open the circuit of the generator field winding, normally connected through rectifiers with the output of an exciter. In a generator which has accessible field winding terminals, as with stationary field windings or a field energized through sliding contacts, this poses no problem as a switch may easily be connected in the circuit. However, it is sometimes desirable to design the generator with a rotating field mounted on the same shaft with the armature of the exciter, and to connect the field through a rectifier system with the exciter armature, the rectifiers being mounted on the rotating shaft. This arrangement eliminates sliding contacts and the attendant problems of brush wear, contact resistance, and the like. However, as the connection between the exciter armature and the generator field is relatively inaccessible, there is no simple way to provide a mechanical switching operation to disconnect the generator field during induction motor operation.

The principal object of this invention is the provision of a control circuit for the generator field which remedies this problem.

One feature of the invention is the provision of a field circuit control for a generator of the character described comprising switch means mounted for rotation with the rotors and connected between the rotor of the exciter and the rotor of the generator with control means for the switch means, responsive to energization of the exciter for causing the switch means to conduct only when the exciter is energized.

A further feature is that the switch control means is voltage sensitive, rendering the switch means conductive only when the exciter is energized to a predetermined level.

Another feature is that rectifier means are connected between the exciter armature and generator field, with the switch means being connected between the rectifier means and field.

Yet another feature is that the switch means comprises a controlled rectifier responsive to excitation of the exciter; and that the control circuit for the controlled rectifier includes a zener diode which prevents actuation of the controlled rectifier unless the output of the exciter exceeds a predetermined level.

And a further feature is the provision in an electric machine adapted to be driven as a generator and to operate as a motor, of a stator having armature windings thereon and a rotor having a field winding together with loading means connected with the field winding to prevent the development of excessive voltages during motor operation.

Figure 2:
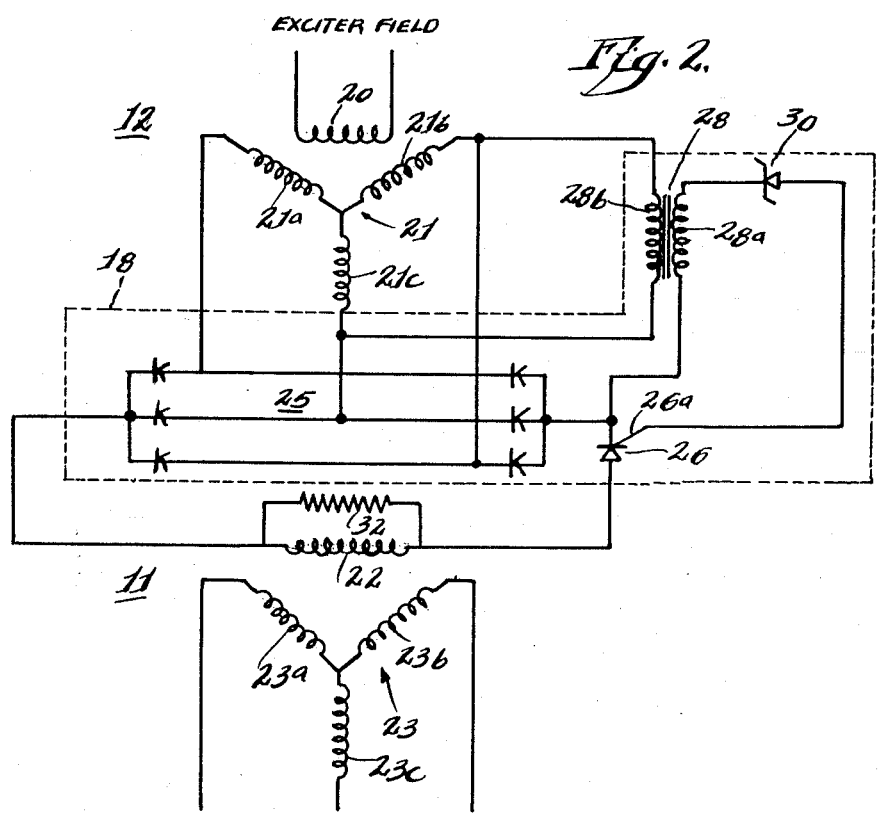

Further objects and advantages will become apparent from the following detailed description taken in connection with the accompanying drawings in which:

FIGURE 1 is a diagrammatic illustration of a system embodying the invention; and FIGURE 2 is a schematic diagram of the exciter and generator circuits of a system embodying the invention.

While this invention is susceptible of embodiments in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

In FIGURE 1, a shaft 10 which may be an output shaft of a constant speed drive system of the character disclosed in the aforementioned patents has mounted thereon the rotors of a generator 11 and an exciter 12. The generator rotor 13 carries the field windings of the generator while the armature or output windings are mounted on the stator 14. The exciter rotor 15 carries the exciter armature windings while the field winding for the exciter is mounted on the stator 16. Connected between the exciter armature 15 and generator field 13 is a control circuit 18 mounted for rotation with shaft 10. As will appear below, control circuit 18 includes switch means for disconnecting the generator field 13 when the exciter field is not energized. This prevents damage to the circuit when generator 11 is operated as a motor.

The circuit is illustrated in schematic form in FIGURE 2. The exciter has a single phase field winding 20, mounted on the exciter stator 16, and a three phase armature winding indicated generally as 21 mounted on rotor 15 and comprising the Y connected windings 21a, 21b and 21c. A single generator field winding 22 is mounted on the generator rotor 13 while a three phase generator armature winding 23, including windings 23a, 23b and 23c is mounted on generator armature 14.

The elements of the control circuit 18 are enclosed within broken lines in FIGURE 2. A full wave three phase rectifier 25 is connected with exciter armature 21 and has a direct current output connected with generator field winding 22, through a controlled rectifier 26, which provides a switch means. The control electrode 26a of controlled rectifier 26 is connected with the secondary winding 28a of a control signal coupling transformer 28, the primary winding 28b of which is connected across one phase of the output of the exciter armature winding 21.

During operation of the machine 11 is a generator, the exciter field is energized from a suitable source, and the controlled rectifier 26 is rendered conductive, completing the connection between full wave rectifier 25 and generator field winding 22. When machine 11 operates as a motor, as by connecting the armature windings 23 with a suitable source of three phase power to start the prime mover in the general system described, the exciter field is not energized and controlled rectifier 26 appears as an open circuit or open switch, disconnecting rectifier 25 from generator winding 22. Thus, even though relatively high voltages may be induced in generator rotor winding 22 during operation of the generator as a motor, rectifier 25 is isolated therefrom and damage to the rectifier elements is prevented.

The control circuit for controlled rectifier 26 preferably includes a voltage sensitive element as zener diode 30, shown connected between the secondary winding 28a and transformer 28 and the controlled rectifier. A Zener diode will not conduct in its forward direction in the absence of a potential sufficient to overcome a threshold voltage which may be of the order of several volts. Accordingly, a small voltage output from the exciter armature, which might result from a low level of retained magnetism in the exciter field structure, is not effective to render controlled rectifier 26 conductive. The rectifier 25 is connected with the generator field winding 22 when and only when the system is normally excited to operate the machine 11 as a generator, i.e., when the exciter field 20, which is a part of the exciter stator structure is excited from an outside source.

A resistive load 32 is connected across generator rotor winding 22 and serves to limit the voltage induced in the field winding when machine 11 is operated as a motor. The value of resistor 32 is preferably of the order of 10 times the resistance of field winding 22 so that it does not appreciably reduce the energy supplied to the field during the generator mode of operation.

I claim:

1. Field circuit control means for a generator having a rotor connected for energization from the rotor of an exciter mounted for rotation with the generator rotor, comprising: switch means mounted for rotation with said rotors and connected between the rotor of said exciter and the rotor of said generator; and control means for said switch means, responsive to energization of said exciter for causing said switch means to conduct only when said exciter is energized.

2. Field circuit control means for a generator having a rotor connected for energization from the rotor of an exciter mounted for rotation with the generator rotor, comprising: switch means mounted for rotation with said rotors and connected between the rotor of said exciter and the rotor of said generator; and voltage sensitive control means, responsive to the output of the rotor of said exciter and conductive only when said rotor is energized above a predetermined level.

3. Field circuit control means for a generator having a rotor connected for energization from the rotor of an exciter mounted for rotation with the generator rotor, comprising: rectifier means connected between the rotor of said exciter and the rotor of said generator; switch means connected between said rectifier means and the rotor of said generator; and control means for said switch means, responsive to energization of said exciter for causing said switch means to conduct only when said exciter is energized.

4. Field circuit control means for a generator having a rotor connected for energization from the three-phase rotor of an exciter mounted for rotation with the generator rotor, comprising: a three-phase full wave rectifier mounted for rotation with said rotors and connected between the exciter rotor output and the rotor of said generator; switch means mounted for rotation with said rotors and connected between the output of said three-phase, full wave rectifier and the rotor of said generator; and control means for said switch means, responsive to an output of said exciter rotor for rendering said switch means conductive when said exciter is energized to a predetermined level.

5. Field circuit control means for a generator having a rotor connected for energization from the rotor of an exciter mounted for rotation with the generator rotor, comprising: a controlled rectifier connected between the output of said exciter rotor and the input of said generator rotor; and control means for said controlled rectifier, responsive to the output of said exciter rotor, rendering said controlled rectifier conductive only when said exciter is energized.

6. Field circuit control means for a generator having a rotor connected for energization from the rotor of an exciter mounted for rotation with the generator rotor, comprising: switch means mounted for rotation with said rotors and connected between the rotor of said exciter and the rotor of said generator; and a Zener diode responsive to energization of said exciter and connected with said switch means, rendering said switch means conductive only when said exciter is energized to a predetermined level.

7. Field circuit control means for a generator having a rotor connected for energization from the rotor of an exciter mounted for rotation with the generator rotor, comprising: a controlled rectifier connected between the output of said exciter rotor and the input of said generator rotor; and a Zener diode responsive to energization of said exciter and connected with said controlled rectifier, rendering said controlled rectifier conductive only when said exciter is energized to a predetermined level.

8. Field circuit control means for a generator having a rotor connected for energization from the rotor of an exciter mounted for rotation with the generator rotor, comprising: switch means mounted for rotation with said rotors and connected between the rotor of said exciter and the rotor of said generator; a transformer having a primary winding connected with the rotor of said exciter and having a secondary; and control means for said switch means connected with the secondary of said transformer, responsive to energization of said exciter for causing said switch means to conduct only when said exciter is energized.

9. Field circuit control means for a generator having a rotor connected for energization from the three-phase rotor of an exciter mounted for rotation with the generator rotor, comprising: a three-phase, full wave rectifier mounted for rotation with said rotors and connected between the exciter rotor output and the rotor of said generator; a controlled rectifier connected between the output of said three phase rectifier and the input of said generator rotor; and a Zener diode responsive to energization of said exciter and connected with said controlled rectifier, rendering said controlled rectifier conductive only when said exciter is energized to a predetermined level.

10. The control means of claim 9 wherein said Zener diode is transformer-coupled to an output of the exciter rotor.

11. The field circuit control means of claim 1 for an electric machine driven by a drive means as a generator and operable as a motor to start said drive means, wherein loading means are connected in parallel with the rotor of said generator.

12. The field circuit control means of claim 5 for an electric machine driven by a drive means as a generator and operable as a motor to start said drive means, wherein a resistor is connected in parallel with the rotor of said generator.

13. The field of circuit control means of claim 12 wherein said resistor has a resistance of the order of ten times the resistance of the generator rotor.

References Cited in the file of this patent

UNITED STATES PATENTS 2,974,234    Rowe _____ Mar. 7, 1961

OTHER REFERENCES

Electrical Engineers' Handbook: Fourth edition; Wiley Handbook Series, November 1953.